United States Patent Office 3,835,056
Patented Sept. 10, 1974

3,835,056
FUNCTIONAL FLUID COMPOSITIONS
Richard F. Heinze and John F. Herber, St. Louis, Mo., assignors to Monsanto Company, St. Louis, Mo.
No Drawing. Filed Oct. 31, 1966, Ser. No. 590,511
Int. Cl. C09k 3/02
U.S. Cl. 252—78                     11 Claims

ABSTRACT OF THE DISCLOSURE

Functional fluid compositions comprising an aromatic compound selected from polyphenyl ethers, polyphenyl thioethers, dihalogenated diphenyl ethers, halogenated phenoxypyridines or mixtures thereof and a halogenated compound selected from halobenzenes, perhalodienes and perhalocyclodienes having not less than 4 nor more than 8 carbon atoms or mixtures thereof which compositions are particularly useful as hydraulic fluids.

---

This invention relates to novel functional fluid compositions comprising mixtures of certain aromatic compounds and certain halogenated compounds.

Many different types of materials are utilized as functional fluids and functional fluids are used in many different types of applications. Such fluids have been used as electronic coolants, atomic reactor coolants, diffusion pump fluids, synthetic lubricants, damping fluids, bases for greases, force transmission fluids (hydraulic fluids) and as filter mediums for air conditioning systems. Because of the wide variety of applications and the varied conditions under which functional fluids are utilized, the properties desired in a good functional fluid necessarily vary with the particular application in which it is to be utilized with each individual application requiring a functional fluid having a specific class of properties.

Of the foregoing, the use of functional fluids as hydraulic fluids, particularly aircraft hydraulic fluids, has posed what is probably the most difficult area of application. Thus, up to a few years ago, the requirements for an aircraft hydraulic fluid could be described as follows:

The hydraulic power systems of aircraft for operating various mechanisms of an airplane impose stringent requirements on the hydraulic fluid used. Not only must the hydraulic fluid for aircraft meet stringent use requirements but in addition such fluid should be as non-flammable as possible and must be sufficiently non-flammable to satisfy aircraft requirements for fire resistance. The viscosity characteristics of the fluid must be such that it may be used over a wide temperature range; that is, adequately high viscosity at high temperature, low viscosity at low temperature and a low rate of change of viscosity with temperature. Such temperature range is generally from —40° F. to 250° F. Its pour point should be low. Its volatility should be low at elevated temperatures of use and the volatility should be balanced; that is, selective evaporation or volatilization of any important component should not take place at the high temperatures of use. It must possess sufficient lubricity and mechanical stability to enable it to be used in the self-lubricated pumps, valves, etc. employed in the hydraulic systems of aircraft which are exceedingly severe on the fluid used. It should be thermally and chemically stable in order to resist oxidation and decomposition so that it will remain uniform under conditions of use and be able to resist the loss of desired characteristics due to high and sudden changes of pressure and temperatures, high shearing stresses, and contact with various metals which may be, for example, aluminum, bronze, copper and steel. It should also not deteriorate the gaskets or packings of the hydraulic system. It must not adversely affect the materials of which the system is constructed, and in the event of a leak, should not adversely affect the various parts of the airplane with which it may accidentally come in contact, such as electrical wire insulation and paint. It should not be toxic or harmful to personnel who may come in contact with it.

While it is evident that the aforementioned requirements are quite severe, the development of the commercial supersonic transport (SST) has imposed requirements on any hydraulic fluid to be used therein which make the satisfaction of such prior requirements appear to be no problem at all.

In the first place, the SST flight control system will be more difficult to design than that of any current commercial aircraft since it must have excellent flight control characteristics both at subsonic and supersonic speeds. It is estimated that the SST, a Mach 3 aircraft, will spend approximately half its time at the climb, hold, and approach conditions. Further, if past and current trends are any indication, it can be assumed that the SST hydraulic functions will be somewhat more numerous than those of current commercial jets. Indications are that the commercial SST will have about 1000 hydraulic horsepower. This extended horsepower demand, needed to drive accessories, landing gear, and the control system, of itself will impose severe reliability considerations on the hydraulic fluid. Coupled to the factor of component numbers versus reliability is the factor of higher temperatures to which the system will be subjected. Surface temperatures of a Mach 3 aircraft will range from 450° F. to 600° F. or higher at stagnation points. By taking advantage of natural heat sinks, such as the fuel in a manner utilized in the B-70, the hydraulic system should be capable of performing with a fluid operating at 400° F. to 500° F. On the other end of the temperature scale, temperatures as low as —60° F. are anticipated.

The Commercial Jet Hydraulics Panel of SAE A6, which was initiated during 1961 for the purpose of investigating and making recommendations for corrections of current fire resistant jet hydraulic systems, found that ⅔ of all hydraulic system incidents during a 1½ year period prior to June 1962 were due to external system leakage, largely from components such as lines, fittings, hoses and seals. This leakage problem was considered by the panel and industry in general to be a very undesirable situation from the standpoint of loss of powered control. In the SST, any leakage problems would be magnified excessively over and above the loss of powered control when one considers the temperatures involved. In this case, there is no longer the situation in which leakage fluid will issue into relatively cold areas, but rather into ambient temperatures as high as 600° F. It is apparent that a flammable fluid injected into hot compartments would create a blow torch effect, an untenable condition. A fire-resistant fluid is thus of greater importance than ever before.

The principal problem facing a fluid supplier, therefore, is that of developing an SST fluid having temperature compatibility in the range of from —50° F. to approximately 400° F. to 500° F. combined with fire resistance. In addition to the foregoing an SST hydraulic fluid must still have the properties mentioned above, including good viscosity characteristics (over a quite extended temperature range), a low freezing point, low volatility, sufficient lubricity, no toxicity and compatibility with various metals, packings and gaskets.

Based upon the specifications of the various SST airframe manufacturers, the requirements for a hydraulic fluid for the SST and similar supersonic aircraft are expected to be as follows:

SST HYDRAULIC FLUID REQUIREMENTS

| Property: | Requirement |
|---|---|
| Viscosity: | |
| —50° F. | 35,000 cs. or less. |
| 400° F. | 0.5 cs. or more. |
| Crystallizing Point | —50° F. minimum. |
| Thermal Stability (Isotenoscope) | 500° F. |
| Fire Resistance: | |
| Molten Aluminum Test 1250° F. | Does not ignite without spark. Self-extinguishing with spark. |
| Hot Manifold Test (AMS 3150C.) | Does not burn on leaving tube or in the pan. |
| High Pressure Spray Test (AMS 3150C +No. 4 Tip) | Does not flash up to 5 feet from orifice. Can flash beyond 5 feet but is self-extinguishing. |
| Volatility | B.P. 500° F. |
| Autogenous Ignition Temperature | 1000° F. |

While the SST requirements set forth above may not appear to be difficult to meet, these requirements are in fact quite severe for many reasons. For example, there are few, if any, individual compounds known which remain usable over the extreme temperature range of at least 550° F. (i.e., from —50° F. crystallizing point to 500° F. thermal stability) much less provide such a usable range, be fire resistant and also have the desired viscosities.

It is, therefore, an object of this invention to provide functional fluid compositions having a combination of properties, such as wide liquid range and fire-resistance, which make such compositions well suited for the various applications mentioned above. It is a further object of this invention to provide functional fluid compositions which are useful as hydraulic fluids, particularly aircraft hydraulic fluids. A further object is to provide functional fluids useful as hydraulic fluids in supersonic aircraft. Other objects will be apparent from the following description of the invention.

It has now been found that functional fluids having excellent fire-resistance coupled with the physical properties necessary to provide compositions useful for the many applications disclosed above and particularly as aircraft hydraulic fluids are compositions comprising (A) an aromatic material selected from the group consisting of:

(1)

(a) a polyphenyl ether,
(b) mixtures thereof;

(2)

(a) a polyphenyl thioether,
(b) mixtures thereof;

(3)

(a) a dihalogenated diphenyl ether,
(b) mixtures thereof;

(4)

(a) a halogenated phenoxypyridine,
(b) mixtures thereof;

(5)

(a) mixtures of any two or more of (1), (2), (3) and (4) and, (B) a halogenated compound selected from the group consisting of halobenzenes, perhalodienes and perhalocyclodienes having not less than 4 nor more than 8 carbon atoms and mixtures thereof.

Compositions of this invention can contain any combination of aromatic materials and halogenated compounds described above which provide a viscosity not greater than about 35,000 cs. at —50° F. Most compositions of this invention will contain by weight from about 10% to about 90% of an aromatic material or mixtures thereof and from about 90% to about 10%, by weight, of a halogenated compound or mixtures thereof.

Thus, compositions have now been discovered which satisfy the stringent requirements of aircraft having supersonic capabilities by combining materials which are inadequate individually but which in combination with the halogenated compounds described herein provide exceptionally desirable fluids having surprisingly superior properties in view of the properties of the components taken separately, such as temperature range and fire resistance.

Preferred aromatic materials useful in the method of this invention are those consisting exclusively of aromatic hydrocarbon radicals linked by ether oxygen atoms exemplified by the phenoxybiphenyls such as biphenylyl phenoxyphenyl ether, biphenylyloxybenzene, bis(biphenylyloxyphenyl)ether, bis(phenoxy)-biphenyl and the like.

One class of preferred aromatic materials is polyphenyl ethers, consisting of aromatic hydrocarbon radicals joined in a chain by oxygen atoms as ether linkages between each ring, of the formula $C_6H_5O—(C_6H_4O—)_n—C_6H_5$ where $n$ is an integer of from 1 to 5. Examples of the polyphenyl ethers contemplated in this class are the bis-(phenoxyphenyl)ethers (4-aromatic hydrocarbon radicals joined in a chain by 3 oxygen atoms), illustrative of which is bis($m$-phenoxyphenyl)ether and the bis(phenoxyphenoxy)benzenes. Illustrative of the bis(phenoxyphenoxy)benzenes are $m$-bis($m$-phenoxyphenoxy)benzene, $m$-bis($p$ - phenoxyphenoxy)benzene, $o$-bis($o$-phenoxyphenoxy)benzene, and so forth. Further, the polyphenyl ethers contemplated therein include the bis(phenoxyphenoxyphenyl)ethers such as bis[$m$-($m$-phenoxyphenoxy)phenyl]ether, bis[$p$-($p$-phenoxyphenoxy)phenyl]ether, and $m$-($m$ - phenoxyphenoxy)phenyl, $m$-($o$-phenoxyphenoxy) phenyl ether and the bis(phenoxyphenoxyphenoxy)benzenes such as $m$-bis[$m$-($m$-phenoxyphenoxy)phenoxy] benzene, $p$-bis[$p$-($m$-phenoxyphenoxy)phenoxy]benzene and $m$-bis[$m$-(phenoxyphenoxy)phenoxy]benzene.

Other polyphenyl ethers are those having all their ether linkages in the *meta* positions since the all *meta*-linked ethers are particularly advantageous because of their wide liquid range and high thermal stability. However, mixtures of the polyphenyl ethers, either isomeric mixtures or mixtures of homologous ethers, can also advantageously be used in some applications, especially where particular properties such as lower solidification points are required.

Mixtures of polyphenyl ethers in which the non-terminal phenylene rings are linked through oxygen atoms in the *meta* and *para* positions have been found to be particularly suitable to provide compositions with wide liquid ranges. Of the mixtures having only *meta* and *para* linkages, a preferred polyphenyl ether mixture of this invention is the mixture of bis(phenoxyphenoxy)benzenes, wherein the non-terminal phenylene rings are linked through oxygen atoms in the *meta* and *para* position, and composed by weight of about 65% *m*-bis(*m*-phenoxyphenoxy)benzene, 30% *m*-[(*m*-phenoxyphenoxy)(*p*-phenoxyphenoxy)]-benzene and 5% *m*-bis(*p*-phenoxyphenoxy)benzene. Such a mixture solidifies at below room temperature (that is, below about 70° F.) whereas the three components solidify individually at temperatures above normal room temperatures.

Other examples of such preferred polyphenyl ethers are those containing, in percent by weight, from about 0% to 6% of *o*-bis(*m*-phenoxyphenoxy)benzene (1), about 40% to 85% of *m*-bis(*m*-phenoxyphenoxy)benzene (2), about 0% to 40% of *m*-[(*m*-phenoxyphenoxy)(*p*-phenoxyphenoxy)]benzene (3), about 0% to 12% of *p*-bis(*m*-phenoxyphenoxy)benzene (4), about 0% to 10% of *p*-[(*p*-phenoxyphenoxy)(*m*-phenoxyphenoxy)]benzene (5), and about 0% to 6% of *m*-bis(*p*-phenoxyphenoxy)benzene, (6).

Preferred polyphenyl ether mixtures are listed below. The number in parenthesis refers to the compound mentioned above having the same number thereafter.

TYPICAL COMPOSITIONS

| Component: | Compositions, percent by weight of components | | | |
|---|---|---|---|---|
| | A | B | C | D |
| (1) | 0 | 6 | 5 | 4.5 |
| (2) | 63 | 82 | 80 | 43.5 |
| (3) | 31 | 0 | 4 | 40 |
| (4) | 0 | 12 | 11 | 4 |
| (5) | 0 | 0 | 0 | 8 |
| (6) | 6 | 0 | 0 | 0 |

Another class of materials which can be employed in compositions of this invention is polyphenyl thioethers. As used herein the term "polyphenyl thioether" means a compound or mixture of compounds represented by the formulae:

I
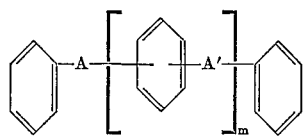

where *m* is a whole number from 0 to 6, A and A' are independently selected from oxygen and sulfur and at least one of A and A' is sulfur, II
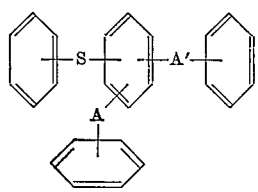

where A and A' are each selected from oxygen and sulfur,

III
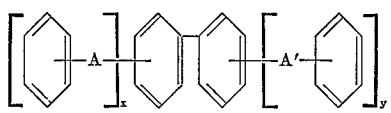

where *x* and *y* are whole numbers from 0 to 3 and the sum of *x*+*y* is from 1 to 6 and A and A' are each selected from oxygen and sulfur but at least one of A and A' is sulfur, and IV
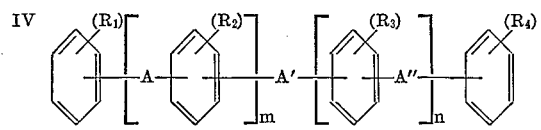

where R₁, R₂, R₃ and R₄ are each selected from the group consisting of alkyl, alkoxy, haloalkyl, said alkyl and alkoxy groups having from 1 to 4 carbon atoms, hydrogen and halogen, A, A' and A" are each selected from the group consisting of oxygen and sulfur provided at least one of A, A' and A" is sulfur, *m* and *n* are integers from 0 to 3 provided the sum of *m*+*n* is at least 1 and mixtures of the foregoing compounds.

Examples of such polyphenyl thioethers are:

2-Phenylmercapto-4'-phenoxydiphenyl sulfide
2-Phenylmercapto-3'-phenoxydiphenyl sulfide
2-Phenoxy-3'-phenylmercaptodiphenyl sulfide
3-Phenoxy-4'-phenylmercaptodiphenyl sulfide
2-Phenoxy-4'-phenylmercaptodiphenyl sulfide
4-Phenoxy-4'-phenylmercaptodiphenyl sulfide
2-Phenoxy-2'-phenylmercaptodiphenyl sulfide
*o*-Bis(phenylmercapto)benzene
*m*-Bis(phenylmercapto)benzene
*p*-Bis(phenylmercapto)benzene
Phenylmercaptodiphenyl
Bis(phenylmercapto)biphenyl
Phenylmercapto(phenoxy)biphenyl
Bis-(*o*-phenylmercaptophenyl)sulfide
Bis-(*p*-phenylmercaptophenyl)sulfide
Bis-(*m*-phenylmercaptophenyl)sulfide
1,2,3-Tris(phenylmercapto)benzene
1-Phenylmercapto-2,3-bis(phenoxy)benzene
1,2,4-Tris(phenylmercapto)benzene
1,3,5-Tris(phenylmercapto)benzene
*o*-Bis(*o*-phenylmercaptophenylmercapto)benzene
*p*-Bis(*p*-phenylmercaptophenylmercapto)benzene
*p*-Bis(*o*-phenylmercaptophenylmercapto)benzene
*p*-Bis(*m*-phenylmercaptophenylmercapto)benzene
*m*-Bis(*p*-phenylmercaptophenylmercapto)benzene
*o*-Bis(*p*-phenylmercaptophenylmercapto)benzene
*ar*-Bis(phenylmercapto-*ar'*-(phenylmercapto)benzene
2,2'-Bis(phenylmercapto)diphenyl ether
2,3'-Bis(phenylmercapto)diphenyl ether
2,4'-Bis(phenylmercapto)diphenyl ether
4,4'-Bis(*m*-tolylmercapto)diphenyl ether
3,3'-Bis(*m*-tolylmercapto)diphenyl ether
2,4'-Bis(*m*-tolylmercapto)diphenyl ether
3,4'-Bis(*m*-tolylmercapto)diphenyl ether
3,3'-Bis(*p*-tolylmercapto)diphenyl ether
3,3'-Bis(xylylmercapto)diphenyl ether
4,4'-Bis(xylylmercapto)diphenyl ether
3,4'-Bis(xylylmercapto)diphenyl ether
3,4'-Bis(*m*-isopropylphenylmercapto)diphenyl ether
3,3'-Bis(*m*-isopropylphenylmercapto)diphenyl ether
2,4'-Bis(*m*-isopropylphenylmercapto)diphenyl ether
3,4'-Bis(*p-tert*-butylphenylmercapto)diphenyl ether
4,4'-Bis(*p-tert*-butylphenylmercapto)diphenyl ether
3,3'-Bis(*p-tert*-butylphenylmercapto)diphenyl ether
3,3'-Bis(*m-di-tert*-butylphenylmercapto)diphenyl ether
3,3'-Bis(*m*-chlorophenylmercapto)diphenyl ether
4,4'-Bis(*m*-chlorophenylmercapto)diphenyl ether
3,3'-Bis(*m*-trifluoromethylphenylmercapto)diphenyl ether
4,4'-Bis(*m*-trifluoromethylphenylmercapto)diphenyl ether
3,4'-Bis(*m*-trifluoromethylphenylmercapto)diphenyl ether
2,3'-Bis(*m*-trifluoromethylphenylmercapto)diphenyl ether
3,3'-Bis(*p*-trifluoromethylphenylmercapto)diphenyl ether
3,3'-Bis(*o*-trifluoromethylphenylmercapto)diphenyl
3,3'-Bis(*m*-methoxyphenylmercapto)diphenyl ether
3,4'-Bis(*m*-isopropoxyphenylmercapto)diphenyl ether
3,4'-Bis(*m*-perfluorobutylphenylmercapto)diphenyl ether
2-*m*-Tolyloxy-2'-phenylmercaptodiphenyl sulfide
2-*p*-Tolyloxy-3'-phenylmercaptodiphenyl sulfide
2-*o*-Tolyloxy-4'-phenylmercaptodiphenyl sulfide
3-*m*-Tolyloxy-3'-phenylmercaptodiphenyl sulfide
3-*m*-Tolyloxy-4'-phenylmercaptodiphenyl sulfide
4-*m*-Tolyloxy-4'-phenylmercaptodiphenyl sulfide 3-Xylyloxy-4'-phenylmercaptodiphenyl sulfide
3-Xylyloxy-3'-phenylmercaptodiphenyl sulfide
3-Phenoxy-3'-m-tolylmercaptodiphenyl sulfide
3-Phenoxy-4'-m-tolylmercaptodiphenyl sulfide
2-Phenoxy-3'-p-tolylmercaptodiphenyl sulfide
3-Phenoxy-4'-m-isopropylphenylmercaptodiphenyl sulfide
3-Phenoxy-3'-m-isopropylphenylmercaptodiphenyl sulfide
3-m-Tolyloxy-3'-m-isopropylphenylmercaptodiphenyl sulfide
4-m-trifluoromethylphenoxy-4'-phenylmercaptodiphenyl sulfide
3-m-trifluoromethylphenoxy-4'-phenylmercaptodiphenyl sulfide
2-m-trifluoromethylphenoxy-4'-phenylmercaptodiphenyl sulfide
3-m-trifluoromethylphenoxy-3'-phenylmercaptodiphenyl sulfide
3-p-chlorophenoxy-3'-phenylmercaptodiphenyl sulfide, and
3-m-bromophenoxy-4'-phenylmercaptodiphenyl sulfide.

Another class of aromatic material useful in compositions of this invention are dihalogenated diphenyl ethers either alone or as base stocks in combination with certain blending agents. The dihalogenated diphenyl ethers are those represented by the formula

V

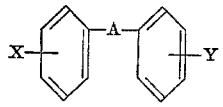

where A is oxygen or sulfur and X and Y are bromine or chlorine.

Typical examples of such ethers and sulfides are (1) different halogen on each ring:

2-bromo-2'-chlorodiphenyl ether,
2-bromo-2'-chlorodiphenyl sulfide,
2-bromo-3'-chlorodiphenyl ether,
2-bromo-3'-chlorodiphenyl sulfide,
2-bromo-4'-chlorodiphenyl ether,
2-bromo-4'-chlorodiphenyl sulfide,
3-bromo-2'-chlorodiphenyl ether,
3-bromo-2'-chlorodiphenyl sulfide,
3-bromo-3'-chlorodiphenyl ether,
3-bromo-3'-chlorodiphenyl sulfide,
3-bromo-4'-chlorodiphenyl ether,
3-bromo-4'-chlorodiphenyl sulfide,
4-bromo-3'-chlorodiphenyl ether,
4-bromo-3'-chlorodiphenyl sulfide,
4-bromo-4'-chlorodiphenyl ether,
4-bromo-4'-chlorodiphenyl sulfide,
4-bromo-2'-chlorodiphenyl ether and
4-bromo-2'-chlorodiphenyl sulfide.

(2) same halogen on each ring:

2,2'-dibromodiphenyl ether,
2,2'-dibromodiphenyl sulfide,
2,3'-dibromodiphenyl ether,
2,3'-dibromodiphenyl sulfide,
2,4'-dibromodiphenyl ether,
2,4'-dibromodiphenyl sulfide,
3,3'-dibromodiphenyl ether,
3,3'-dibromodiphenyl sulfide,
3,4'-dibromodiphenyl ether,
3,4'-dibromodiphenyl sulfide,
4,4'-dibromodiphenyl ether,
4,4'-dibromodiphenyl sulfide,
2,2'-dichlorodiphenyl ether,
2,2'-dichlorodiphenyl sulfide,
2,3'-dichlorodiphenyl ether,
2,3'-dichlorodiphenyl sulfide,
2,4'-dichlorodiphenyl ether,
2,4'-dichlorodiphenyl sulfide,
3,3'-dichlorodiphenyl ether,
3,3'-dichlorodiphenyl sulfide,
3,4'-dichlorodiphenyl ether,
3,4'-dichlorodiphenyl sulfide,
4,4'-dichlorodiphenyl ether and
4,4'-dichlorodiphenyl sulfide.

The ethers are generally preferred over the sulfides because their lower melting points make them usable in a wider number of applications and of the ethers, those in which the halogen substituents are in the 3,4'-relationship are preferred for use in the compositions of this invention, because their low melting points are the lowest of all the ethers.

Still another class of aromatic material useful in compositions of this invention is certain pyridine derivatives which can be represented by the formula

VI

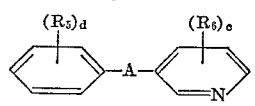

wherein A is selected from the group consisting of oxygen and sulfur; $R_5$ and $R_6$ are each selected from the group consisting of fluorine, chlorine and bromine; $c$ is an integer from 0 to 2, $d$ is an integer from 0 to 5 and the sum of $c+d$ is from 1 to 7; and mixtures thereof. The preferred compounds of formula VI are those of the above structure where $R_5$ and $R_6$ are each selected from bromine and chlorine and the sum of $d+c$ is from 1 to 3; provided that when $c+d$ is 1, $R_5$ or $R_6$, as the case may be, is bromine.

The pyridine derivatives can be prepared by (1) reacting an alkali metal salt of a 3-hydroxypyridine with halogenated benzene or conversely by (2) reacting an alkali metal salt of a phenol with a halogenated pyridine in which there is a halogen in the 3-position. For the compounds where A is S, that is, 3-phenylmercaptopyridines, the same general procedures are used except that in procedure (1) a 3-mercaptopyridine is substituted for the 3-hydroxypyridine, and in procedure (2) a thiophenol is substituted for a phenol. To facilitate preparation of both classes of compounds an inert solvent can be used.

Examples of pyridine derivatives useful in compositions of this invention are 3-(2'-bromophenoxy)pyridine,
3-(3'-bromophenoxy)pyridine,
3-(4'-bromophenoxy)pyridine,
3-(3'-fluorophenoxy)pyridine,
3-(3'-chlorophenylmercapto)-5-chloro-pyridine, and
3-(4'-chlorophenylmercapto)-5-chloro-pyridine.

The halobenzenes useful in compositions of this invention are those represented by the formula

VII

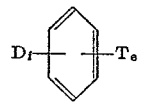

where T is bromine, D is selected from the group consisting of chlorine and fluorine, $e$ is an integer from 0 to 2 and $f$ is an integer from 0 to 6 provided that $e$ is at least 1 when $f$ is less than 6 and further provided that when $f$ is 0 $e$ is 2. It has been found that p-dibromobenzene and brominated benzenes having more than 2 bromine atoms per benzene nucleus have very limited solubility in the aromatic components of the compositions of this invention and are not useful for that reason. However, mixtures of monobromobenzene with higher brominated benzenes, wherein the average combined bromine content of the mixture is at least 2 atoms of bromine per benzene nucleus, are useful in compositions of this invention and are included within the meaning of the term halobenzene but are not preferred.

Typical examples of halobenzenes useful in compositions of this invention are o-dibromobenzene, 1-bromo-3-chlorobenzene, 1,3-dichloro - 5 - bromobenzene, 1,3-difluoro-5-bromobenzene, 1-fluoro-3-chloro - 5 - bromobenzene, 1,2,3,4 - tetrachloro-5-bromobenzene, 1,2,3,4-tetrafluoro-5-bromobenzene, 1,3 - dibromo-5-chlorobenzene, 1,3-dibromo-5-fluorobenzene, 1,3-dibromo-3,5-dichlorobenzene, 1,3-dibromo-4,6-difluorobenzene, hexafluorobenzene, hexachlorobenzene and preferably m-dibromobenzene.

The perhalodienes and perhalocyclodienes useful in this invention are those compounds having at least 4 and not more than 8 carbon atoms in the molecule. Typical perhalodienes are perchlorobutadiene, perbromobutadiene, perfluorobutadiene, perchloropentadiene, perfluoropentadiene, perbromopentadiene, perchlorohexadiene, perbromohexadiene, perchloroheptadiene, perchlorooctadiene, perbromooctadiene and perfluorooctadiene. Perchlorobutadiene is preferred. Typical perhalocyclodienes are perchlorocyclobutadiene, perfluorocyclobutadiene, perchlorocyclopentadiene, perbromocyclopentadiene, perfluorocyclopentadiene, perchlorocyclohexadiene, perbromocyclohexadiene, perchlorocycloheptadiene, perchlorocyclooctadiene and perfluorocyclooctadiene.

Typical properties of the above described aromatic materials are set forth in Table I below. The tests are procedures used to measure the various properties of the fluids of this invention and the components thereof are as follows:

Viscosity—ASTM D-445-61

Autogenous Ignition Temperature—ASTM D-2155-63T

In addition, the solution or melting point of the compositions of this invention were also measured. Because the compositions of the instant invention easily supercool (as do the components) crystallizing points are difficult to determine. However, since solution point and crystallizing point coincide the solution point was generally measured.

Solution points were determined by placing a test composition in a test tube provided with an agitator and suspending the apparatus in a well insulated Dry Ice-acetone bath. The Dry Ice-acetone bath was maintained at a temperature in the range of −30° F. to −50° F., a range considered high enough to prevent a glass from forming and low enough to speed up potential crystallization. After a test composition had been agitated for about eight hours, seeds of one of the components were added. The seeded composition was then stored in a cold box at −50° F. for sixteen hours and then agitated in the Dry Ice-acetone bath for eight hours. The cycle was then repeated. Those mixtures which did not crystallize after one week were warmed to room temperature to make the fluids pourable and were transferred to small bottles with lids. The bottles were then placed in cold storage at −60° F.

The thermal stability of the components and compositions of this invention were determined by the use of an isoteniscope according to the procedure of Blake et al., J. Chem. Eng. Data, 6, 87 (1961). When a fluid is heated in the isoteniscope apparatus, it exerts a vapor pressure which can be readily measured. The vapor pressure increases as temperature is increased following a straight line relationship when logarithm of pressure is plotted versus the reciprocal of the absolute temperature. The vapor pressure curve will depart from a straight line if decomposition occurs to give volatile products. The temperature at which this occurs is called the decomposition temperature ($T_D$).

TABLE I

| Compound | Solution point, °F. | Boiling point, °F. | Thermal stability, °F. | Viscosity, cs. −40° F. | Viscosity, cs. 100° F. | Viscosity, cs. 210° F. | Flash point, °F. | Fire point, °F. | AIT °F. |
|---|---|---|---|---|---|---|---|---|---|
| A mixture of m-bis(bis(m-phenoxyphenoxy)benzene, 65% by wt.; m-[(m-phenoxyphenoxy)(p-phenoxyphenoxy)]benzene, 30% by wt.; m-bis(p-phenoxyphenoxy)benzene, 5% by wt. | | | | Glass | 363 | 13.1 | 550 | 660 | 1,135 |
| A mixture of m-bis(phenylmercapto)benzene, 31% by wt.; m-phenoxy-m-phenylmercapto benzene, 15% by wt.; m-(m-phenylmercapto)benzene, 45% by wt.; m-chlorodiphenyl sulfide; 8% by wt. | | | | >500,000 | 12.41 | 2.77 | 405 | 500 | 930 |
| 3,3′-dichlorodiphenyl ether | 54 | 596 | 784 | 1,972 | 3.77 | 1.27 | | | |
| 4-bromo-3′-chloro-diphenyl ether | −8 | 640 | 639 | 11,680 | 4.37 | 1.46 | | | |
| 3,3′-dibromo diphenyl ether | 84 | 670 | 648 | | 6.10 | 1.60 | | | |
| 3,3′-dichlorodiphenyl sulfide | 57 | 656 | 718 | 2,320 | 4.55 | 1.47 | | | |
| 3-bromo-4′-chloro-diphenyl sulfide | 104 | 720 | | | | 1.66 | | | |
| m-bis(phenylmercapto)benzene | ←40 | 428 | [1] 0.3 | | 35,000 | 12.4 | 3.05 | | |
| m-bis(m-phenylmercaptophenyl)sulfide | | 500 | [1] 0.5 | | [2] 11,307 | 50.8 | 5.92 | | |
| m-bis(m-phenoxyphenoxy)benzene | | 560 | [1] 25 | | | 3.37 | 12.7 | | |
| m-bis(phenoxyphenyl)ether | | 467 | [1] 2.5 | | | 62.0 | 6.00 | | |
| Bis(phenylmercapto)biphenyl | | 401–482 | [1] 0.25 | | | | 19.03 | | |
| m-bis(phenoxy)benzene | | 325 | [1] 2.5 | | | 12.4 | 2.62 | | |
| 3-(2′-bromophenoxy)pyridine | | | | | | 7.47 | 1.69 | | |
| 3-(3′-bromophenoxy)pyridine | | | | | [3] 9,220 | 6.13 | 1.60 | | |
| 3-(3′-fluorophenoxy)pyridine | | | | | 519.1 | 3.29 | 1.15 | | |

[1] Mm. Hg.  [2] −20° F.  [3] −30° F.

Although the compounds set forth in Table I above have a combination of physical properties which make them well suited for use as functional fluids, yet in most cases they are defficient with respect to some property which limits their commercial applicability. The problem to which the present invention is directed, therefore, is to provide functional fluids having the combination of properties discussed above and which, therefore, retain good fire resistance yet are improved with respect to one or more other properties such as low or high temperature viscosity or solution point. The problem can also be stated, in the case of those aromatic materials not having the desired fire resistance, of improving their fire resistance without adversely affecting viscosity and thermal stability and to also obtain fluids having good low temperature properties. The solution to the above stated problem has been discovered by applicants by combining the above-described aromatic compounds with certain halogenated compounds. Typical properties of the halogenated compounds are listed in Table II below.

TABLE II

| Compound | Viscosity, cs. −40° F. | Viscosity, cs. 100° F. | Viscosity, cs. 210° F. | AIT, °F. | Flash point, °F. | Fire point, °F. |
|---|---|---|---|---|---|---|
| m-Dibromobenzene | Solid | 0.866 | 0.467 | 1,150 | None | None. |
| Hexachlorobutadiene | do | 1.479 | 0.724 | 1,100 | do | Do. |
| Hexachlorocyclopentadiene | | 2.99 | 1.03 | | do | Do. |

The deficiencies of the afore-described aromatic materials are significantly improved by the addition of the above-described halogenated compounds to provide the compositions of this invention typical examples of which all their properties are listed in Table III below.

Several tests were used for the measurement of the fire resistance of the instant fluids since there is no single test that can be used to evaluate all types of fluids under all expected use conditions. The degree of fire resistance in any given test is influenced by the characteristics of the fluid, the type of flame or source of ignition, the total amount of fluid, the physical state of the fluid, and many other factors.

The early technical committees working on fire-resistant hydraulic fluid specifications for aircraft recognized the many factors involved in assessing fire resistance. As a result, the specifications developed by the SAE and the military required several different methods for testing the flammability of proposed products.

These specifications include the same general type of fire resistance tests. The tests were designed to simulate conditions in aircraft resulting from a broken line spraying hydraulic fluid into various sources of ignition and are known as the "High-pressure Spray Test," and the "Hot Manifold Test." The test procedures to measure the fire resistance of the compositions of this invention are as follows:

Hot Manifold Test—AMS 3150C
High Pressure Spray Test—AMS 3150C

Preferred compositions of this invention comprise certain polyphenyl ethers and m-dibromobenzene. Such compositions preferably contain by weight from about 45% to about 65% m-dibromobenzene and from about 35% to about 55% polyphenyl ether or mixtures of polyphenyl ethers. Still more preferably, compositions highly suitable for use in aircraft having supersonic capabilities contain, by weight, from about 50% to 60% m-dibromobenzene and from about 40% to about 60% polyphenyl ether or mixtures of polyphenyl ethers.

Especially significant are the low temperature viscosities of the compositions of this invention. The preferred compositions of this invention, that is, compositions comprising certain polyphenyl ethers and m-dibromobenzene, have excellent viscosity characteristics throughout the broad temperature range (−50° F. to 600° F.) encountered in aircraft having supersonic capabilities. This discovery is surprising in view of the viscosity characteristics of the polyphenyl ethers and m-dibromobenzene individually as above-described.

TABLE III

| No. | Composition components | Wt. percent of components | Viscosity, cs. −40° F. | 100° F. | 210° F. | AIT, ° F. | Hot manifold test | High pressure spray test |
|---|---|---|---|---|---|---|---|---|
| 1 | A mixture of m-bis(m-phenoxyphenoxy)benzene, 65% by wt.; m-[(m-phenoxyphenoxy)(p-phenoxyphenoxy)]benzene, 30% by wt.; m-bis(p-phenoxyphenoxy)benzene, 5% by weight. | 45 | 12,000 | 8.21 | 2.14 | 1,150 | Intermittent burning along bead when sprayed. Does not flash or burn when dripped on manifold. | Does not flash or burn up to eight feet from the orifice. |
| | m-Dibromobenzene | 55 | | | | | | |
| 2 | A mixture of m-bis(m-phenoxyphenoxy)benzene, 65% by wt.; m-[(m-phenoxyphenoxy)(p-phenoxyphenoxy)]benzene, 30% by wt.; m-bis(p-phenoxyphenoxy)benzene, 5% by weight. | 44 | 8,500 | 7.68 | 2.04 | 1,150 | do | Do. |
| | m-Dibromobenzene | 56 | | | | | | |
| 3 | 3,4′-dibromodiphenyl ether | 87 | 13,104 | | | 1,160 | No burning—No flashing | Do. |
| | m-Dibromobenzene | 13 | | | | | | |
| 4 | A mixture of m-bis(m-phenoxyphenoxy)benzene, 65% by wt.; m-[(m-phenoxyphenoxy)(p-phenoxyphenoxy)]benzene, 30% by wt.; m-bis(p-phenoxyphenoxy)benzene, 5% by weight. | 37.5 | 29,000 | | 2.05 | | | |
| | Hexachlorobutadiene | 62.5 | | | | | | |

The compositions of this invention also possess good lubricating properties as evidenced by the results obtained from testing such compositions on the Four-ball machine. Typical results are listed in Table IV below. The composition number corresponds to the composition of the same number listed in Table III.

TABLE IV

| | Load, kg. | Scar diameter, mm. | |
|---|---|---|---|
| | | 600 r.p.m. | 1,200 r.p.m. |
| Composition number: | | | |
| 1 | 10 | 0.45 | 0.59 |
| | 50 | 0.77 | 1.86 |
| 4 | 10 | 0.74 | 1.01 |
| | 50 | 1.02 | 1.25 |

Test conditions.—Steel on steel balls for 1 hour at 300° F.

In addition to the above, the compositions of this invention are shear stable and are not prone to foaming and any foam is not stable. Furthermore, the claimed compositions are stable, even at temperatures of 600° F. and in the presence of oxidation, and are essentially non-corrosive to metals such as aluminum, bronze, iron, silver and titanium. A further advantage of the compositions of this invention is their outstanding hydrolitic stability as evidenced by the data in Table V below. The data in Table V were obtained by subjecting various fluids to a hydrolitic stability and corrosion test. In this test, a sample of test fluid is placed into a stainless steel container together with weighed metal specimens in the form of ½" x 1" x ¹⁄₁₆" metal plates having a surface area exposed to the fluid of 6.75 cm.² which specimens were suspended from the top of the container into the fluid and separated by glass spacers. The metals used were titanium, aluminum, silver, iron, copper and stainless steel. Water was added to the fluid in the amount of .5% by volume of the fluid used. The container was fitted to an apparatus which rotated the container end over end. The apparatus and the container were placed in an oven at 450° F. wherein the container was rotated for 72 hours. At the end of the test the metal specimens were removed, flushed to remove non-adhering material, dried and weighed, to determine the difference in the weight of the specimens from that prior to the test. The results obtained are presented in Table V below as the weight change in milligrams per square centimeter of surface area. The composition number corresponds to the composition of the same number listed in Table III above. The mixtures of polyphenyl ethers employed in Composition 1 had little or no effect on the metal specimens.

TABLE V

| Composition | Weight change, mg./cm.$^2$ | | | | | |
|---|---|---|---|---|---|---|
| | Ti | Al | Ag | Fe | Cu | SS |
| 1 | +0.06 | +0.19 | +1.92 | +0.14 | −0.19 | +0.04 |
| m-Dibromobenzene | +8.34 | +14.44 | +4.75 | −21.74 | +6.15 | −0.37 |

In the data contained in Table V above, it is to be noted that surprisingly composition 1, a preferred composition of this invention, did not reduce the weight of the iron specimen although the major component of the compositions, i.e., m-dibromobenzene, when tested alone proved to be extremely corrosive to iron. As stated above, the polyphenyl ethers employed in Composition 1 had little or no effect on any of the metals when tested alone.

As a result of the excellent physical properties of the functional fluids of this invention, improved hydraulic pressure devices can be prepared in accordance with this invention which comprise in combination a fluid chamber and an actuating fluid in said chamber, said fluid comprising a mixture of this invention. In such a hydraulic apparatus wherein a moveable member is actuated by the above-described functional fluids, performance characteristics are obtainable which are superior to those heretofore obtainable.

Because of the excellent fire-resistance of the functional fluids of this invention, their exceptionally low pour points, and good lubricity, the functional fluids of this invention can be utilized in those hydraulic systems wherein power must be transmitted and the frictional parts of the system lubricated by the hydraulic fluid utilized. Thus, the novel functional fluids of this invention find utility in the transmission of power in a hydraulic system having a pump therein supplying the power for the system. In such a system, the parts which are so lubricated include the frictional surfaces of the source of power, namely the pump, valves, operating pistons and cylinders, fluid motors, and in some cases, for machine tools, the ways, tables and slides. The hydraulic system may be of either the constant-volume or the variable-volume type of system.

The pumps may be of various types, including the piston-type pump, more particularly the variable-stroke piston pump, the variable-discharge or variable displacement piston pump, radial-piston pump, axial-piston pump, in which a pivoted cylinder block is adjusted at various angles with the piston assembly, for example, the Vickers Axial-Piston Pump, or in which the mechanism which drives the pistons is set at an angle adjustable with the cylinder block; gear-type pump, which may be spur, helical or herringbone gears, variations of internal gears, or a screw pump, or vane pumps. The valves may be stop valves, reversing valves, pilot valves, throttling valves, sequence valves or relief valves. Fluid motors are usually constant- or variable-discharge piston pumps caused to rotate by the pressure of the hydraulic fluid of the system with the power supplied by the pump power source. Such a hydraulic motor may be used in connection with a variable-discharge pump to form a variable-speed transmission.

The compositions of this invention can also contain dyes, pour point depressants, stabilizers, anti-oxidants, viscosity index improvers, lubricity agents and the like. While this invention has been described with respect to various specific examples and embodiments, it is to be understood that the invention is not limited thereto and that it can be variously practiced within the scope of the following claims.

We claim:
1. A composition consisting essentially of
(A) from about 10% to about 90% by weight of an aromatic material selected from the group consisting of:

(1)

(a) a polyphenyl ether represented by the formula $C_6H_5$—O—$(C_6H_4$—O$)_n$—$C_6H_5$ wherein $n$ is an integer of from 1 to 5,
(b) mixtures thereof;

(2)

(a) a polyphenyl thioether selected from the group consisting of compounds represented by the formulae:

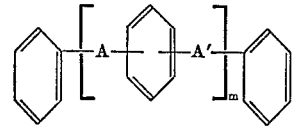

where $m$ is a whole number from 0 to 6, A and A' are independently selected from oxygen and sulfur and at least one of A and A' is sulfur,

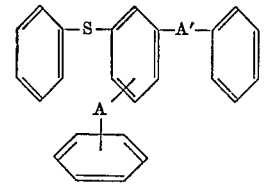

where A and A' are each selected from oxygen and sulfur,

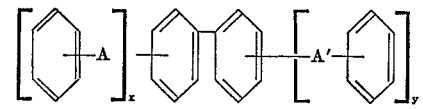

where $x$ and $y$ are whole numbers from 0 to 3 and the sum of $x+y$ is from 1 to 6 and A and A' are each selected from oxygen and sulfur but at least one of A and A' is sulfur, and

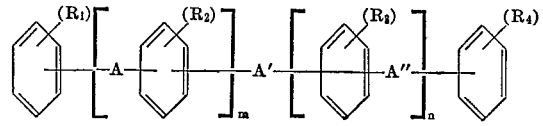

where $R_1$, $R_2$, $R_3$, and $R_4$ are each selected from the group consisting of alkyl, alkoxy, haloalkyl, said alkyl and alkoxy groups having from 1 to 4 carbon atoms, hydrogen and halogen, A, A' and A'' are each selected from the group consisting of oxygen and sulfur provided at least one of A, A' and A'' is sulfur, $m$ and $n$ are integers from 0 to 3 provided the sum of $m+n$ is at least 1
(b) mixtures thereof;

(3)

mixtures of any of (1) and (2) and,
(B) from about 10% to about 90% of a halogenated compound selected from the group consisting of halobenzenes, perhalodienes and perhalocyclodienes having not less than 4 nor more than 8 carbon atoms and mixtures thereof.

2. A composition of Claim 1 where the aromatic material is a mixture of polyphenyl ethers.

3. A composition of Claim 1 where the polyphenyl ether is phenoxybiphenyl.

4. A composition of Claim 3 where the polyphenyl ether contains 5 aromatic hydrocarbon radicals.

5. A composition of Claim 4 where the halogenated material is perchlorobutadiene.

6. A composition of Claim 1 where the aromatic material is a polyphenyl thioether.

7. A composition of Claim 6 where the halogenated material is perchlorobutadiene.

8. A composition of Claim 4 where the halogenated compound is m-dibromobenzene.

9. A composition of Claim 1 where the aromatic material is a mixture comprising at least one polyphenyl ether and at least one polyphenyl thioether.

10. Composition consisting essentially of 35 to 55% by weight of a polyphenyl ether represented by the formula (A)(1)(a) of Claim 1 and 45 to 65% by weight of meta-dibromobenzene.

11. Composition consisting essentially of (A) 40 to 60% by weight of an ether represented by the formulae (A)(1)(a) or (2)(a) of Claim 1 and (B) 60 to 40% by weight of a perchlorobutadiene.

References Cited
UNITED STATES PATENTS

| | | | |
|---|---|---|---|
| 2,509,620 | 5/1950 | Watson et al. | 252—78 |
| 3,098,103 | 7/1963 | Reifschneider | 260—609 |
| 3,100,801 | 8/1963 | Reifschneider | 260—609 |
| 3,240,817 | 3/1966 | Carlson | 260—613 |
| 3,325,451 | 6/1967 | Blanchard | 260—47 |
| 3,362,934 | 1/1968 | Bolon | 260—47 |
| 3,450,770 | 6/1969 | Campbell et al. | 260—609 |

LEON D. ROSDOL, Primary Examiner

P. E. WILLIS, Assistant Examiner

U.S. Cl. X.R.

252—77

PO-1050
(5/69)

UNITED STATES PATENT OFFICE
CERTIFICATE OF CORRECTION

Patent No. 3,835,056          Dated September 10, 1974

Inventor(s) Richard F. Heinze et al.

It is certified that error appears in the above-identified patent and that said Letters Patent are hereby corrected as shown below:

Column 6, line 65, "3,3'-Bis(o-trifluoromethylphenylmercapto) diphenyl"

should be -- 3,3'-Bis(o-trifluoromethylphenylmercapto) diphenyl ether --.

Column 7, line 24, "material" should be -- materials --.

Column 9, line 49, "The tests are" should be -- The tests or --.

Column 10, line 51, "defficient" should be -- deficient --.

Signed and Sealed this fourteenth Day of October 1975

[SEAL]

Attest:

RUTH C. MASON
*Attesting Officer*

C. MARSHALL DANN
*Commissioner of Patents and Trademarks*